United States Patent Office 3,501,471
Patented Mar. 17, 1970

3,501,471
NOVEL 2,3-HETEROCYCLIC FUSED QUINUCLI-DINES, AND 3-SUBSTITUTED QUINUCLIDINE-2-CARBOXYLATE DERIVATIVES
William Alan Remers, Suffern, and Gabriel Joseph Gibs, Pearl River, N.Y., and Martin Joseph Weiss, Oradell, N.J., assignors to American Cyanamid Company, Stamford, Conn., a corporation of Maine
No Drawing. Filed Sept. 21, 1966, Ser. No. 580,894
Int. Cl. C07d 51/04
U.S. Cl. 260—250
6 Claims

ABSTRACT OF THE DISCLOSURE

The preparation of 2,3-heterocyclic fused quinuclidines and 3-substituted quinuclidine-2-carboxylate derivatives are described. The heterocyclic fused derivatives are prepared by reacting a 3-ketoquinuclidine-2-carboxylate with hydrazine, guanidine and the like, and also by reaction of a 2-dehydroquinuclidine with certain 1,3-dipolar reagents. The 2-carboxylate derivatives are prepared from a 3-ketoquinuclidine-2-carboxylate by reaction with appropriate reagents. These compounds are useful as central nervous depressants and analgesic agents.

This invention relates to new organic compounds. More particularly, it relates to new quinuclidine derivatives and to methods for their preparation.

The novel compounds of this invention may be represented by the following general diagram:

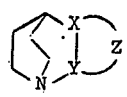

wherein the

moiety is a member of the group consisting of

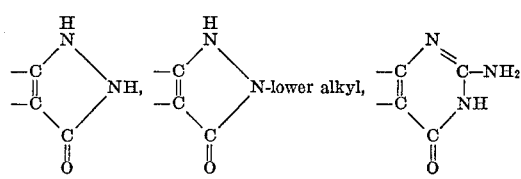

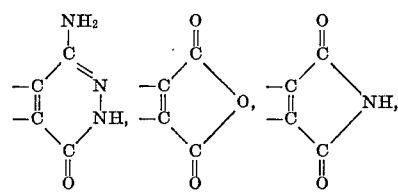

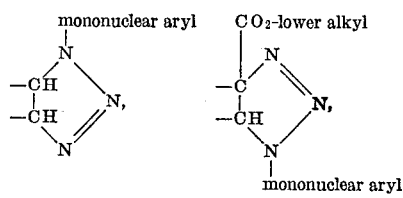

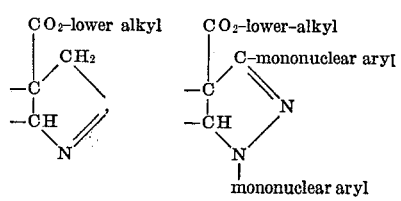

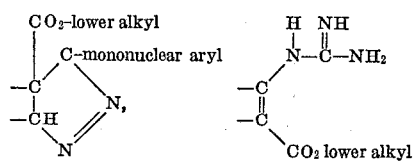

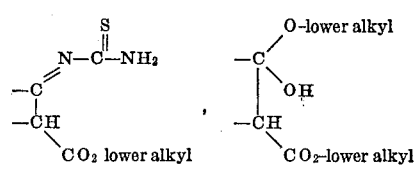

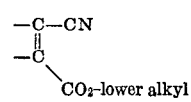

and the tautomaric forms thereof and the non-toxic acid addition salts thereof.

The novel compounds of this invention are, in general, white crystalline solids. They are soluble in the usual organic solvents, as for example, alcohol and acetone. The salts of the compounds are soluble in water. The compounds of this invention are central nervous system depressants and as such are useful as sedatives, tranquilizers and the like. They are also useful as analgesics and anti-inflammatory agents.

The preparation of these novel compounds is diagramed by the reactions in the flowsheet directly following.

FLOWSHEET
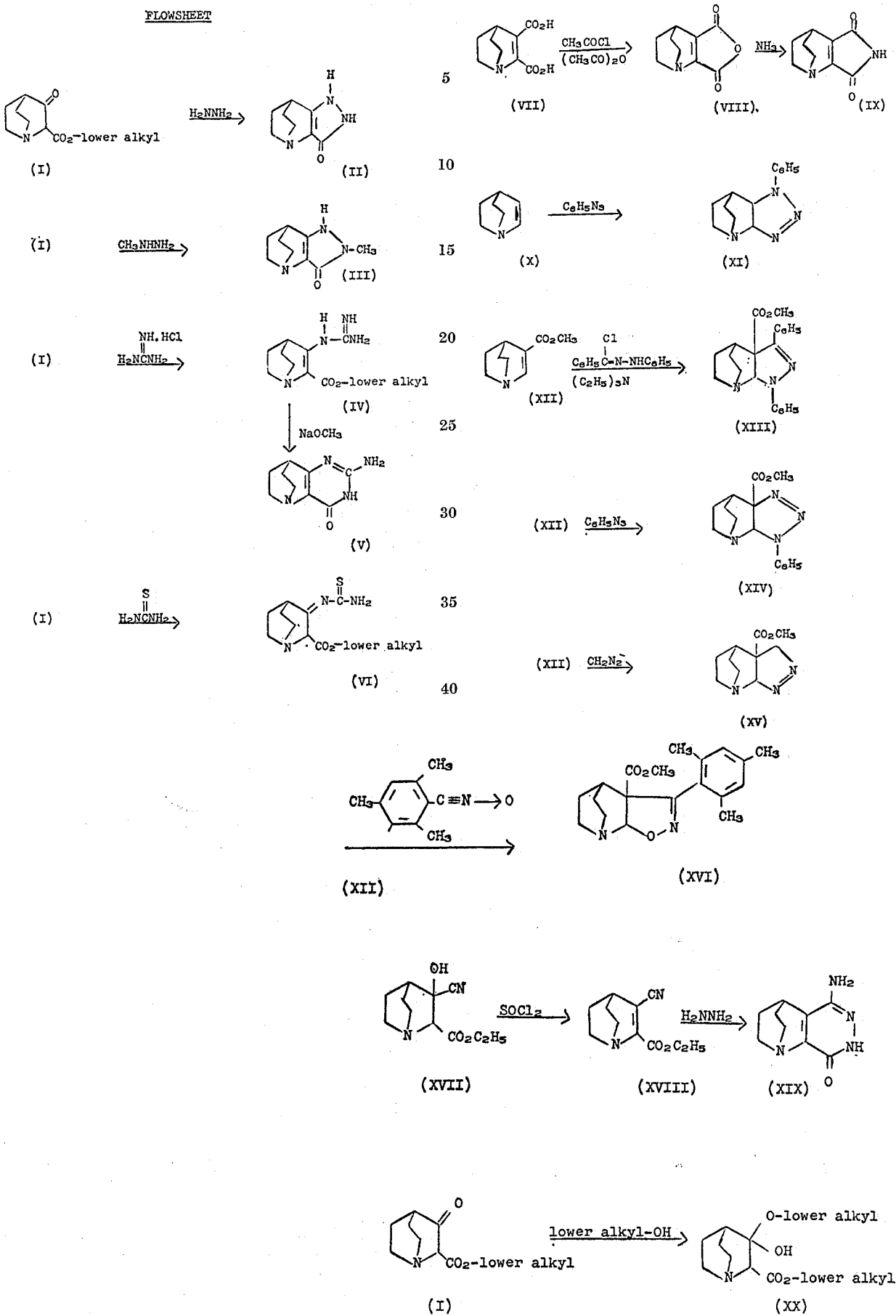

Thus, treatment of a lower alkyl ester of 3-quinuclidinone-2-carboxylic acid, such as ethyl 3-quinuclidininone-2-carboxylate (I), with hydrazine or a lower alkyl substituted hydrazine, such as methylhydrazine, affords the corresponding pyrazolone derivatives (II) and (III), respectively. Guanidine hydrochloride and thiourea give with the hydrochloride salt of (I) the corresponding guanidino derivative (IV) and thiocarbamoylimino derivative (VI), respectively, as their hydrochloride salts. If two equivalents of sodium methoxide are added to a solution of (IV) dihydrochloride, the product is aminopyrimidinone derivative (V). When 2,3-dehydroquinuclidine-2,3-dicarboxylic acid (VII) is heated with acetyl chloride and acetic anhydride, the corresponding anhydride (VIII) is formed. Treatment of anhydride (VIII) with anhydrous ammonia gives the corresponding imide (IX).

The dehydroquinuclidine system is susceptible to the addition of various 1,3-dipolar reagents and novel heterocycle derivatives are formed by such additions. Thus, 2,3-dehydroquinuclidine (X) and a mononuclear aryl azide, such as phenyl azide, react to give a triazoline derivative such as (XI). Similarly, a lower alkyl 2,3-dehydroquinuclidine-3-carboxylate such as (XII) reacts with phenyl azide to give a triazoline derivative such as (XIV). Compounds such as (XII) also react with N-(α-chlorobenzylidine)-N'-phenylhydrazine and triethylamine, with mesitylene nitrile oxide, and with diazomethane to give the pyrazoline derivative (XIII), isoxazoline derivative (XVI), and pyrazoline derivative (XV), respectively. It is not possible to make a conclusive assignment for the structures (XI), (XIII), (XIV), (XV), and (XVI) derived from the 1,3-dipolar addition reactions, because there is a possible alternative mode of cycloaddition which would give the ring fusion in an inverted manner. Thus the structures noted above could also be:

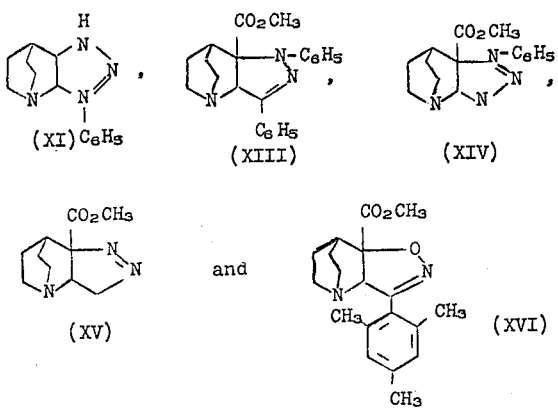

However, on the basis of theoretical considerations, the structures which we have assigned are more probable than these alternative structures and the representations of one is intended to include the other. Treatment of a lower alkyl 3-cyano,3-dehydro-2-quinuclidine carboxylate, such as (XVIII), prepared from the corresponding cyanhydrin (XVII) by dehydration with an agent such as thionyl chloride, with hydrazine affords an amino pyridazinone such as (XIX). Heating the hydrochloride salt of a lower alkyl ester of 3-quinuclidine-2-carboxylic acid (I) with a lower alkyl alcohol, such as propanol, gives the corresponding 3-hemiketal (XX).

The invention is more clearly described in conjunction with the following examples showing in detail the preparation of representative compounds of the invention.

EXAMPLE 1

Preparation of pyrazol[3]ino[4,3-b]quinuclidin-3-one (II)

A mixture of 7.01 g. of ethyl 3-quinuclidinone-2-carboxylate hydrochloride and 25 ml. of hydrazine hydrate is heated at reflux temperature for 16 hours and then is concentrated to dryness. The residual solid is treated with 30 ml. of 1 N hydrochloric acid and the resulting solution is concentrated to dryness. This procedure gives the desired product as its hydrochloride salt, melting point 213–216° C.

EXAMPLE 2

Preparation of 2-methylpyrazol[3]ino[4,3-b]quinuclidin-3-one (III)

A mixture of 9.35 g. of ethyl 3-quinuclidine-2-carboxylate hydrochloride and 40 ml. of methylhydrazine is heated at reflux temperature for 4 hours and then is concentrated to dryness. A solution of the residue in 50 ml. of water is neutralized with hydrochloric acid and the resulting solution is concentrated. The residual oil is dissolved in methylene chloride. Addition of hexane to this solution precipitates the desired product, which, after recrystallization from methylene chloride-hexane, has melting point 217–220° C.

EXAMPLE 3

Preparation of ethyl 2,3-dehydro-3-guanidinoquinuclidine-2-carboxylate (IV)

A mixture of 7.01 g. of ethyl 3-quinuclidinone-2-carboxylate hydrochloride, 2.87 g. of guanidine hydrochloride, and 60 ml. of ethyl alcohol is heated at reflux temperature for 2 hours, cooled, and diluted with ether. This procedure gives the desired product as its dihydrochloride monohydrate, white crystals, melting point 179–181° C.

EXAMPLE 4

Preparation of 2-amino-3H-pyrimidino[5,4-b]quinuclidin-4-one (V)

A solution of 2.5 g. of ethyl 2,3-dihydro-3-quanidino-quinuclidine-2-carboxylate dihydrochloride hydrate (Example 3) in 70 ml. of ethanol is treated with 1.14 g. of sodium ethoxide in ethanol. The mixture is filtered after 30 minutes and the filtrate is heated at reflux temperature for 16 hours. The resulting solution is concentrated under reduced pressure. Recrystallization from the crystalline residue from ethanol affords the desired product as its guanidinate hemihydrate, white needles, melting point 258° C.

EXAMPLE 5

Preparation of ethyl 3-thiocarbamoyliminoquinuclidine-2-carboxylate (VI)

A mixture of 7.01 g. of ethyl 3-quinuclidinone-2-carboxylate hydrochloride, 2.28 g. of thiourea and 150 ml. of ethanol is heated at reflux temperature for 24 hours, concentrated under reduced pressure to one-half of the original volume and cooled to 5° C. The resulting mixture is filtered and the filtrate is concentrated, affording the desired product as its hydrochloride alcoholate, yellow glassy solid.

EXAMPLE 6

Preparation of 2,3-dehydroquinuclidine-2,3-dicarboxylic acid anhydride (VIII)

A mixture of 0.89 g. of 2,3-dehydroquinuclidine-2,3-dicarboxylic acid [Zh. Obshch. Khim., 31, 3251 (1961)], 5 ml. of acetyl chloride, and 20 ml. of acetic anhydride is heated at reflux temperature for 16 hours. Removal

EXAMPLE 7

Preparation of 2,3-dehydroquinuclidine-2,3-dicarboxylic acid imide (IX)

A solution of 2,3-dehydroquinuclidine-2,3-dicarboxylic acid anhydride (Example 6) in the minimum volume of tetrahydrofuran is treated with excess anhydrous ammonia. The desired product precipitates as a white solid; $\nu_{max}$ 3300, 1650 cm.$^{-1}$.

EXAMPLE 8

Preparation of 1-phenyl-v-triazol[2]ino[4,5-b] quinuclidine (XI)

A mixture of 1.40 g. of 2,3-dehydroquinuclidine (Helv. Chim. Acta., 37, 2170 [1954]) and 1.52 g. of phenyl azide is heated on a steam bath for 24 hours. Upon cooling, colorless needles crystallize from the resulting solution. Washing these needles with a little methanol gives the desired product, melting point 160–163° C.

EXAMPLE 9

Preparation of methyl 2,7-diphenylpyrazol[5]ino[3,4-b] quinuclidine-6a-carboxylate (XIII)

A mixture of 0.84 g. of methyl 2,3-dehydroquinuclidine-3-carboxylate (Helv. Chim. Acta., 37, 1689 [1954]), 1.61 g. of N-(α-chlorobenzylidine) - N' - phenylhydrazine (Ber., 63, 3213 [1930]), and 25 ml. of tetrahydrofuran is cooled in an ice bath and treated with 0.81 g. of triethylamine in 10 ml. of tetrahydrofuran. After 16 hours the mixture is filtered and the filtrate is concentrated. The residue is treated with ether and the resulting mixture is filtered. Anhydrous hydrogen chloride is passed into the filtrate and the precipitate which forms is recrystallized two times from ethanol. This procedure gives the desired product as its hydrochloride salt, melting point 223–235° C.

EXAMPLE 10

Preparation of methyl 3-phenyl-v-triazol[1]ino[4,5-b] quinuclidine-7a-carboxylate (XIV)

A mixture of 1.13 g. of phenyl azide and 1.67 g. of methyl 2,3-dehydroquinuclidine - 3 - carboxylate (Helv. Chim. Acta., 37, 1689 [1954]) is heated on a steam bath for 24 hours. The semi-solid material which forms on cooling is treated with ether and thereupon solidifies. Washing with methanol removes certain dark impurities and the residual solid is recrystallized from methanol. This procedure gives the desired product as white crystals, melting point 143.5–145.5° C.

EXAMPLE 11

Preparation of methyl pyrazol[1]ino[3,4-b] quinuclidine-6a-carboxylate (XV)

A solution of 1.13 g. of methyl 2,3-dehydroquinuclidine-3-carboxylate (Helv. Chim. Acta., 37, 1689 [1954]) in 70 ml. of methylene chloride is treated at ice-bath temperature with a solution of diazomethane (prepared from 1.99 g. of N-methyl-N-nitroso-N'-nitroguanidine) in 100 ml. of ether. After 40 hours the resulting solution is concentrated and the residual yellow oil is dissolved in ether and treated with anhydrous hydrogen chloride. The white solid which forms is washed with ether and crystallized from ethanol. This procedure gives the desired product as its hydrochloride salt, melting point 173.5–174.5° C.

EXAMPLE 12

Preparation of methyl 3-mesitylisoxazol[2]ino[5,4-b] quinuclidine-3a-carboxylate (XVI)

Solutions of 3.34 g. of methyl 2,3-dehydroquinuclidine-3-carboxylate (Helv. Chim. Acta., 37, 1689 [1954]) in 15 ml. of tetrahydrofuran and of 4.84 g. of 2,4,6-trimethylbenzonitrile oxide (J. Org. Chem., 30, 2809 [1965]) in 50 ml. of tetrahydrofuran are combined and heated at reflux temperature for 20 hours. After removal of the solvent, the residue is treated with ether. The resulting mixture is filtered and the filtrate is treated with anhydrous hydrogen chloride. Two recrystallizations from ethanol of the solid which forms gives the desired product as its hydrochloride salt, melting point 206–207.5° C.

EXAMPLE 13

Preparation of ethyl 3-cyano-2,3-dehydroquinuclidine-2-carboxylate (XVIII)

To 60 ml. of ice-cooled thionyl chloride is added in portions 7.46 g. of ethyl 3-cyano-3-hydroxyquinuclidine-2-carboxylate (Zh. Obshch. Khim., 31, 3251 [1961]). The resulting solution is heated at reflux temperature for 16 hours, cooled, and concentrated. Recrystallization from the residue from ethanol gives the desired product as its hydrochloride salt, melting point 166–167.5° C.

EXAMPLE 14

Preparation of 8-amino-2H-pyridazino[4,5-b] quinuclidin-3-one (XIX)

A mixture of 0.95 g. of ethyl 3-cyano-2,3-dehydroquinnuclidine-2-carboxylate hydrochloride (Example 13) and 20 ml. of hydrazine hydrate is heated at reflux temperature for 2 hours and then is partially concentrated and cooled. The crystals which separate are recrystallized two times from ethanol. This procedure gives the desired product as its hydrochloride salt, melting point 298–301° C.

EXAMPLE 15

Preparation of ethyl 3-hydroxy-3-propoxyquinuclidine-2-carboxylate (XX)

A solution of ethyl 3-quinuclidinone-2-carboxylate hydrochloride in propyl alcohol is heated at reflux temperature for 18 hours. The excess solvent is removed under reduced pressure and the residual oil is dissolved in ether, filtered, and treated with anhydrous hydrogen chloride. This procedure gives the desired product as its hydrochloride salt, melting point 119.5–121.5° C.

What is claimed is:

1. A quinuclidine compound selected from the group consisting of compounds of the formula:

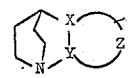

wherein the group 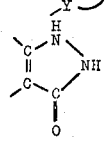 is selected from the group consisting of 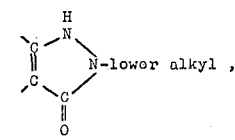

2. The quinuclidine compound according to claim 1; methyl pyrazo[1]ino[3,4-b]quinuclidine-6a-carboxylate.

3. The quinuclidine compound according to claim 1; methyl 3-phenyl-v-triazo[1]ino[4,5-b]quinuclidine-7a-carboxylate.

4. The quinuclidine compound according to claim 1; pyrazol[3]ino[4,3-b]quinuclidin-3-one.

5. The quinuclidine compound according to claim 1; 8-amino-2H-pyridazino[4,5-b]quinuclidin-3-one.

6. The quinuclidine compound according to claim 1; 2,3-dehydroquinuclidine-2,3-dicarboxylic acid imide.
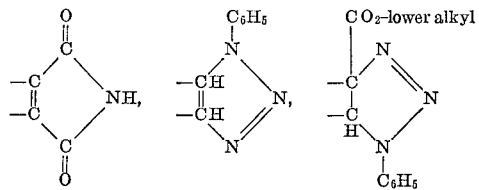
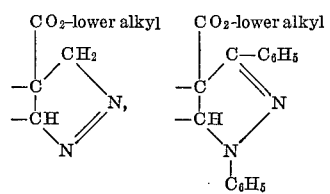
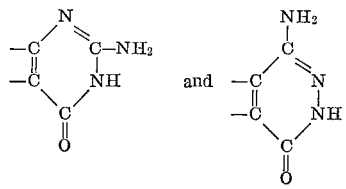
and the non-toxic acid addition salts.
References Cited
UNITED STATES PATENTS
3,079,392  2/1963  Pesson.
NICHOLAS S. RIZZO, Primary Examiner
U.S. Cl. X.R.
260—256.4, 293, 294, 294.3, 999